Figure 1:
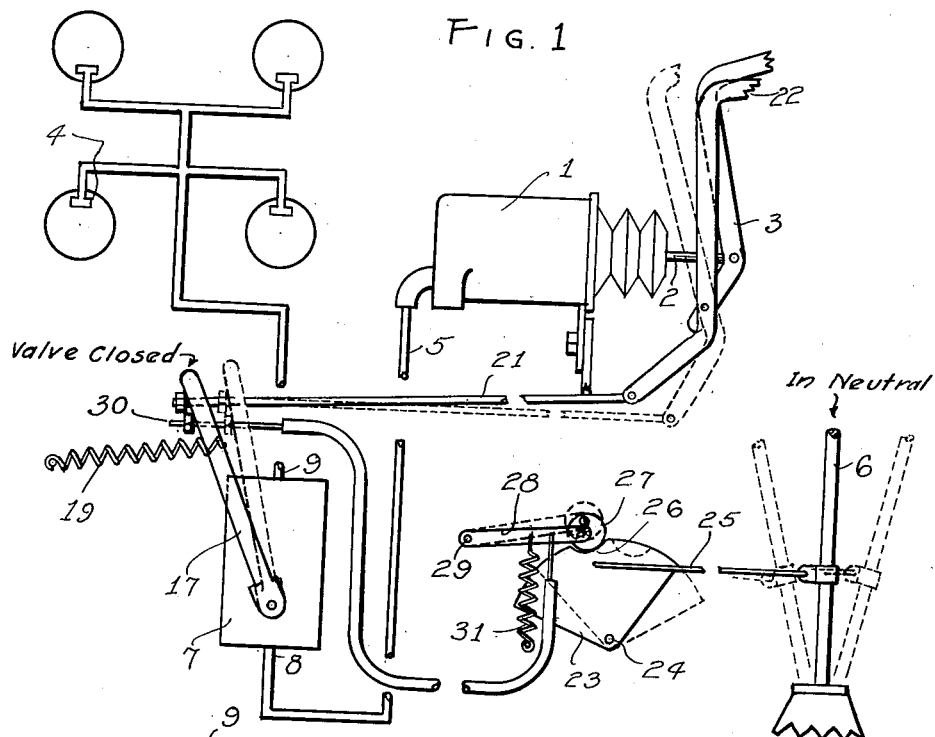

Oct. 13, 1942.    J. G. PHIPPS    2,298,509
HYDRAULIC BRAKE CONTROL
Filed Oct. 17, 1940

Inventor
JOHN G. PHIPPS
By:- Ben V. Zillman
Attorney

Patented Oct. 13, 1942

2,298,509

UNITED STATES PATENT OFFICE 2,298,509

HYDRAULIC BRAKE CONTROL

John G. Phipps, Springfield, Mo.

Application October 17, 1940, Serial No. 361,575

5 Claims. (Cl. 192—4)

This invention relates to improvements in motor vehicles and more particularly to a control for the hydraulic brakes cooperating therewith.

The invention has, among its objects, the production of a control for the hydraulic brake system of a motor vehicle, which will be simple in construction and operation, sturdy, positive in action, requiring little or no servicing to maintain proper operation, of low cost, and which will be otherwise satisfactory and efficient for such use as is deemed applicable.

One of the principal objects of this invention is to so construct a device of the kind set forth, wherein the desired operation is had through the usual manipulation of the vehicle, without the necessity of extra levers and so forth to confuse the operator.

Another object of this invention is to provide a mechanism that will hold the brakes in applied position when the clutch of the vehicle is in engaged position or the gear shift lever of the vehicle is in neutral position, and the brakes applied.

An added object of my invention is to provide a brake-holding means that will be released upon either shift position other than neutral, with the clutch in disengaged position; that is, upon the usual and ordinary actuation through the motor of the vehicle from a stationary position.

A further object of my invention is to provide a vertically movable weighted ball for controlling the passage of hydraulic fluid between the brakes and the master cylinder, so that the full effect of gravity in addition to spring-pressure may be used to hold the ball in valve-sealing position, and so that the brakes will be held in applied position regardless of whether or not the vehicle is headed up-hill or down-hill, or on a straight-away.

A still further object of this invention is to employ an auxiliary sealing ball in connection with the principal sealing ball, for controlling the sealing of the brake fluid between the valve and the brakes, the two balls being so proportioned and spaced and each provided with an independent valve seat, that both balls may be in fully seated position to cumulatively seal the fluid against undesired passage therepast, this effect being accomplished mainly by using an auxiliary ball of slightly less diameter than the distance between the pair of ball seats in the valve.

Many other objects and advantages of the construction herein shown and described and the uses mentioned, will be obvious to those skilled in the art to which this invention appertains, from the disclosures herein given.

To this end, my invention consists in the novel construction, arrangement and combination of parts herein shown and described, as will be more clearly pointed out in the claims hereunto appended.

Figure 2:
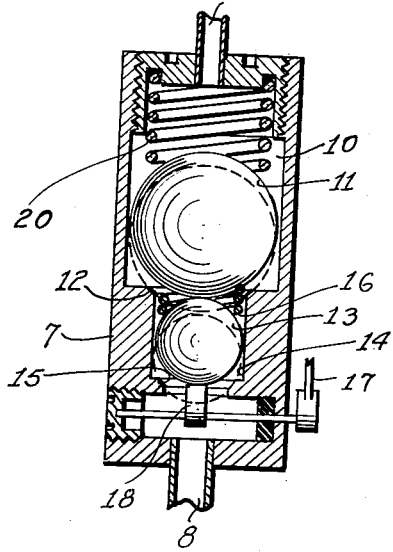

In the drawing, wherein like reference characters indicate like or corresponding parts throughout the views, Figure 1 is a view partly in elevation and partly diagrammatic, showing various parts of a motor vehicle, including the braking system, clutch mechanism and change speed mechanism; and Figure 2 is a cross-sectional view taken through the valve unit, showing the valve in lifted or open position, in full lines, and the valve in closed or sealing position, in dotted lines.

Referring more particularly to the drawing, wherein I have illustrated a preferred embodiment of my invention, there is disclosed a fairly generally-used type of hydraulic braking system using a master cylinder device 1 with a piston actuating rod extending therefrom at 2 and connected to the service brake pedal 3. The hydraulic fluid is forced through this master cylinder by the braking movement of the pedal 3, said fluid travelling to the set of wheel brakes 4 through the conduit 5 leading to the latter.

The usual speed-changing mechanism has the gear shift lever 6 projecting therefrom for manual manipulation, and of course, the lever may be positioned in neutral position or in either the forward or reverse drive positions.

In order to hold the brakes in applied position, and especially so when making short stops at frequent intervals, as for example, when the vehicle is employed in connection with certain types of service businesses, such as milk deliveries, newspaper delivery, etc., all without stopping the motor, I have provided the means hereinafter described.

A valve housing 7 is interposed at some point intermediate the master cylinder and the brakes, having an intake or inlet port 8 communicating with the master cylinder conduit 5, and having an outlet or discharge port 9 communicating with the extension of this conduit 5 to the brakes, somewhat as indicated clearly in Fig. 1. Vertically movable within the chamber 10 of the valve housing, is a ball element 11.

adapted to seat at 12 to close said housing against passage of hydraulic fluid therepast, in one direction, when so seated.

A spring 20 may be interposed between the top of the chamber 10 and said ball, to yieldably press the latter toward its seat, and against the pressure of which the fluid must act in order to force the fluid past the seated ball. A second or auxiliary ball element 13 may be used to augment the action and positiveness of action of the main ball, this auxiliary element being similarly vertically movable within the chamber 14 communicating directly with the upper chamber 10 and in effect forming an extension of the latter, there being a seat 15 at the lower end of the chamber 14 and against which the ball 13 engages to seal passage thereat. A spring 16 may be employed if so desired, to press the ball 13 toward its seat 15, and if this spring engages the upper ball too, as shown, it should be sufficiently weak to avoid holding the latter ball off its seat at all times.

The ball elements seat in unison and form a double seat and seal against leakage of the hydraulic fluid past them from the brakes, especially when the vehicle, with its brakes set, stands over a long period of time. In order to insure a better action of the ball element, the auxiliary ball is of slightly less diameter than the distance between the pair of ball seats, so that both balls may be seated simultaneously even though a slight bit of grit or dirt is accidentally between one of the balls and its seat.

An operating arm 17 is mounted on the valve casing, the same carrying a cam 18 or other suitable means for positively lifting the ball elements off their seats, as indicated in full lines in Fig. 2, the rocking of the arm to the full line position of Fig. 1 permitting the balls to drop and be pressed to their seated position shown in dotted lines in Fig. 2. A spring 19 constantly urges the arm 17 to maintain the balls in their seated position.

A rod 21 interconnects the arm 17 and the clutch pedal 22 of the clutch-actuating mechanism so that when the clutch is in its disengaged position by depressing the pedal, shown in dotted lines in Fig. 1, the balls are in their unseated position, thereby maintaining the valve open; but when the clutch is in its engaged position, with the pedal lifted as indicated in full lines in Fig. 1, the arm 17 is pulled or retrieved by the spring 19 to hold the balls in their seated position to close the valve.

While the balls are seated to close the valve, actuation of the brake pedal in its braking movement forces the brake fluid past the balls, the fluid pressure lifting them temporarily to permit of the passage of the brake fluid to operate the shoes 4; but leakage of the fluid in the opposite direction past the balls is prevented, because the fluid pressure between the balls and the brake shoes serves to hold the balls firmly seated.

In order to have the action and operation of the mechanism of the foregoing apparatus as nearly like that of the conventional motor vehicle elements as possible, as not to confuse the operator, but at the same time holding the vehicle locked in its braked position until positively released therefrom through the usual gear shift or clutch mechanism manipulations, I have arranged the following control means.

A segment or arc element 23 is pivoted at some suitable point 24, as for example adjacent the gear shift lever 6, and is operably connected to the latter through a link 25. A recess 26 is provided at some predetermined point along the peripheral face of said segment, in the path of travel of and releasably receiving a roller 27 carried at one end of a roller arm 28, the other end of said arm being pivoted at 29.

A Bowden-wire 30, such as is commonly employed between a pair of cooperating movable elements to push or pull them in unison, has one end connected to the roller arm 28 and the other end loosely but operably connected to the arm 17, so that the substantially vertical movement of said roller transmits a substantially horizontal movement to said arm.

Now, with the parts in their full line position shown in Fig. 1 (the gear shift lever 6 being in its neutral position and the clutch in its engaged position), the valve is in closed position, the arm 17 having been retrieved to said position. Movement of the brake pedal in its braking movement will now force the brake fluid past the closed valve, holding the fluid in the brakes and holding the vehicle locked against rolling movement.

A subsequent movement of the shift lever or of the clutch pedal will cause the Bowden-wire 30 or the rod 21 respectively, to actuate the arm 17 to valve-opening position, thereby releasing the brakes. This is a normal manner of manipulation of such a motor vehicle in commencing the rolling of the vehicle from a standing position, and there are no extraneous devices to manipulate by hand or foot, nor any unusual movements that must be engaged in by the operator.

While the vehicle is travelling in gear, then no matter whether or not the clutch is engaged or disengaged, movement of the brake pedal in its braking movement will not actuate the balls to seat; hence, the customary braking may be performed without locking the brakes.

However, when it is desired to hold the vehicle at a dead stop, no matter whether the same is headed up-hill or down, or on a horizontal plane, this can be done either with the motor running or shut off.

If it is desired to lock the vehicle with the motor running, as when making a delivery, or for some other purpose, the car is brought substantially to a halt in the usual manner, and after the gear shift lever is placed into its neutral position (shown in full lines in Fig. 1), subsequent application of the brakes will halt the car and hold the brakes locked until positively released by some subsequent operation.

In order to retrieve the roller 27 into the recess when the latter is in vertical alignment therewith, a spring 31 may be connected to exert a constant pull on the roller, as seen in Fig. 1.

Now, upon starting up of the motor, or in starting the vehicle in motion from said locked position, the shifting of the shift lever and manipulation of the clutch pedal will be sufficient to pull the arm 17, against the tension of the spring 19, whereupon the balls will be lifted to permit free passage in opposite directions of the brake fluid therepast. This, of course, is sufficient to release the brakes, in the event that they have been locked.

Having thus described my invention, it is obvious that various immaterial modifications may be made in the same without departing from the spirit of my invention; hence I do not wish to be understood as limiting myself to the exact form, arrangement, construction and combination herein shown and described, nor the uses mentioned, except as limited by the state of the art to which this invention applies and the claims hereunto appended.

What I claim as new and desire to secure by Letters Patent is:

1. In a motor vehicle provided with fluid-actuated brakes, a change-speed gearing lever, a clutch-actuating mechanism, valve means comprising a liftable ball for controlling the communication of fluid to and from said brakes, and means operable by moving said lever to neutral position and the clutch-actuating mechanism into engaged position to seat said ball to close said valve and prevent the return of said fluid therepast to hold said brakes in applied position, and operable to open said valve upon further movement of said clutch-actuating mechanism or lever.

2. In a motor vehicle provided with fluid-actuacted brakes, a change-speed gearing lever, a clutch-actuating mechanism, valve means for controlling the communication of said fluid to and from said brakes, and means for maintaining said valve means closed to prevent return flow of said fluid upon actuating the lever to neutral position with the clutch-actuating mechanism engaged, the subsequent changing movement of said lever or clutch-actuating mechanism opening said valve, said last-mentioned means comprising movable elements operably connected to said lever and mechanism, and another movable element operably connected to said valve and operably engaging the first movable elements to move in unison with the same to open or close said valve.

3. In a motor vehicle provided with a fluid-actuated brake, a change-speed gear lever, a clutch-actuating mechanism, valve means controlling the passage of brake fluid to and from said brakes and permitting the free passage of fluid when the clutch-actuating mechanism is in engaged position or when the lever is in other than neutral position, but preventing said free passage and holding said brakes applied while the clutch-actuating mechanism is in engaged position and said lever is in neutral, said valve means comprising a chamber having a pair of seats one above the other, a pair of vertically movable balls each seatable on one of said seats within said chamber, the diameter of the lowermost ball being less than the distance between said seats, and means engageable with the latter ball and operable by said clutch actuating means and said lever in a predetermined manner for actuating said balls to lift them consecutively off their seats to open said valve.

4. In a motor vehicle provided with fluid-actuated brakes, a change-speed gearing lever, a valve for controlling the communication of fluid to and from said brakes, and means for controlling the valve comprising a valve-operating arm movable to open or close said valve, a movable element connected to said lever to operate in unison therewith, a roller element engaging said last-mentioned element so as to be moved in one direction when said lever is in its neutral position and to be moved in the reverse direction at the other positions of said lever, and a connection between said roller element and said arm to transmit movement therebetween.

5. In a motor vehicle provided with a fluid-actuated brake, a change-speed gear-actuating mechanism, a clutch-actuating mechanism, and valve means operably actuated by both of said mechanisms for controlling the passage of brake fluid to and from said brake, said valve means comprising a chamber having a pair of seats one above the other, a pair of vertically movable balls each seatable on one of said seats, the diameter of the lowermost ball being less than the distance between said seats, and means engageable with the latter ball and operable by both of said actuating mechanisms for actuating said balls to lift them consecutively to open said valve.

JOHN G. PHIPPS.